US008111167B2

United States Patent
Kopp

(10) Patent No.: US 8,111,167 B2
(45) Date of Patent: Feb. 7, 2012

(54) LEVEL INDICATOR AND PROCESS FOR ASSEMBLING A LEVEL INDICATOR

(75) Inventor: Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 337 days.

(21) Appl. No.: 12/379,661

(22) Filed: Feb. 26, 2009

(65) Prior Publication Data
US 2009/0224928 A1    Sep. 10, 2009

Related U.S. Application Data

(60) Provisional application No. 61/064,602, filed on Mar. 14, 2008.

(30) Foreign Application Priority Data

Mar. 6, 2008  (EP) ..................... 08004185

(51) Int. Cl.
G08B 21/00    (2006.01)
(52) U.S. Cl. .......... 340/614; 340/612; 73/290 R; 73/756
(58) Field of Classification Search .................. 340/614, 340/612, 618, 626, 611, 603; 29/729; 73/290 V, 73/866, 290 R, 756, 700; 333/252
See application file for complete search history.

(56) References Cited

U.S. PATENT DOCUMENTS

| 5,955,684 | A  |    | 9/1999  | Gravel et al. |
|-----------|----|----|---------|---------------|
| 6,062,095 | A  |    | 5/2000  | Mulrooney et al. |
| 6,148,681 | A  |    | 11/2000 | Gravel et al. |
| 6,393,909 | B1 |    | 5/2002  | Fahrenbach et al. |
| 7,255,002 | B2 | *  | 8/2007  | Gravel et al. ............... 73/290 V |
| 7,450,055 | B2 | *  | 11/2008 | Eriksson ..................... 342/124 |
| 2006/0225499 | A1 | | 10/2006 | Gravel et al. |

FOREIGN PATENT DOCUMENTS
DE    101 26 654 A1    12/2002

* cited by examiner

*Primary Examiner* — Anh V La
(74) *Attorney, Agent, or Firm* — The Nath Law Group; Jerald L. Meyer; Stanley N. Protigal

(57) ABSTRACT

The invention relates to a level indicator (100) for measuring the fill level of a container, with an electronic control and evaluation system (132, 232) and an interface (133, 233), that are positioned in a housing (131, 231); a sensor unit with a sensor and attachments; a signal cable (110, 210) for connecting the electronic control and evaluation system (132, 232) and the sensor unit; and a connecting device (120, 240), which produces both a mechanical connection between the sensor unit and the housing (131, 231) of the electronic control and evaluation system (132, 232), and an electrical connection between the interface (133, 233) of the electronic control and evaluation system (132, 232) and the signal cable (110, 210), such that both the mechanical and electrical connections produced by the connecting device (120, 240) are separable. The invention also relates to a process for assembling a level indicator (100) having a control and evaluation unit (130).

14 Claims, 2 Drawing Sheets

LEVEL INDICATOR AND PROCESS FOR ASSEMBLING A LEVEL INDICATOR

This is a Non-Provisional Application of U.S. Provisional Patent Application Ser. No. 61/064,602, filed on Mar. 14, 2008, and claims foreign priority to the European Patent Application Serial. No. 08 004185.8, filed on Mar. 6, 2008, the entire contents of which are hereby incorporated by reference in its entirety.

This disclosure relates to a level indicator for measuring the fill level of a container, with an electronic control and evaluation system with an interface, both positioned in a housing, a sensor unit with a sensor and attachments, a signal cable for connecting the electronic control and evaluation system and the sensor unit, and a connecting device, which produces both a mechanical connection between the sensor unit and the housing of the electronic control and evaluation system, and an electrical connection between the interface of the electronic control and evaluation system and the signal cable, and to a process for assembling the level indicator.

Conventional measuring devices for insertion into containers, particularly level indicators and devices intended to measure fill pressure, are usually constructed of a plurality of components.

A first component is the control and evaluation unit, which is generally positioned outside of the container whose interior must be monitored with respect to pressure or fill-level. This arrangement ensures that the control and evaluation unit is easily accessible, which is a condition that may be desirable, e.g., in order to input control commands, to safeguard an external energy supply, or to permit the readout of measured data. Since the control and evaluation unit is located outside the container (which may be set up out-of-doors), the control and evaluation electronic equipment contained in it is usually protected from heavy precipitation, particularly hale, or from severe solar radiation, by a housing.

A second component is the sensor unit, which is positioned inside the container and as a rule has one sensor (usually contained in a sensor housing), with attachments. The sensor measures a physical magnitude which is correlated with the fill level or fill pressure and, by means of the attachments, provides a signal that corresponds to the measured value. The sensor housing provides a stable configuration and serves to protect the sensor.

It is clearly necessary for signal communication between the electronic control and evaluation system, on the one hand, and the sensor unit, on the other, to be possible through the container wall. A signal cable, usually one with a plurality of leads, lends itself to this purpose, such that the signal cable is connected inside the container to the attachments belonging to the sensor unit, and outside the container is connected, via a process attachment, to an interface of the electronic control and evaluation system. In this regard, two essential points must be taken into consideration.

First, it must be ensured that the seal of the container is not compromised in the area of the cable lead-through. At the same time, the connections between the interface of the electronic control and evaluation system and the signal cable, and the attachments leading from the sensor unit to the signal cable, must be protected against environmental effects inside and outside the container—which means that the process attachment must be tightly sealed with both the container and the housing. For example, if it were possible, even over a period of several months, for moisture to enter an outdoor container—specifically, around the connection between the signal cable and the interface of the electronic control and evaluation system—, then erroneous measurements might arise and, in the worst case, a short circuit that destroys the level indicator.

For this reason it is customary to manufacture and deliver these level indicators and pressure-measuring instruments with components that are firmly connected to each other. To this end, the electronic control and evaluation system contained in the housing is connected in mechanically and electrically inseparable fashion to the process attachment, which contains the signal cable, along with its sealing. The electrical connection between the interface of the electronic control and evaluation system and the signal cable is produced by crimp sleeves that are integrated into the process attachment, and sections of the signal cable leads, which have been unbraided or stripped from the direction of the signal cable and (if so desired) provided with sleeves, are introduced into these crimp sleeves and brought into contact with interface pins coming from direction of the electronic control and evaluation system, so that there is a crimp connection on both sides. The sensor unit is secured at the other end of the signal cable, and the attachments of the sensor unit are used to produce an electrical connection with the leads of the signal cable. To install into the container the level indicator thus configured it is then only necessary to guide the sensor unit through an opening in the container and seal this opening with the process attachment, making it tight against liquid and/or gas.

In the described procedure a difficulty arises in that the cable and/or wiring length is predetermined. Typical cable lengths employed in industrial applications lie in the range of several meters. At the same time, however, changes of a few centimeters in the sensor position can drastically influence the quality of the attainable data. Even if the optimal position of the sensor unit inside the container were known in advance, the user would have to specify to the manufacturer the length of the needed cable with an accuracy of several tenths of a percent of the overall length. In actual practice, however, it is often necessary, as a result, e.g., of manufacturing tolerances, to individually adjust the sensor position, and thus the cable length, for different containers, even when the same container type is involved. This leads, at a minimum, to the purchase of level indicators that cannot be optimally installed, and in many cases to incorrect orders being placed, and thus to unnecessary expenses.

This problem is solved by a level indicator in which both the mechanical and the electrical connections produced by the connecting device are separable ones. The problem is similarly solved by a process for assembling a level indicator which includes insertion into the container of the sensor unit connected to the signal cable, lead-through of the signal cable through a container wall or through a flange that is used to seal a hole in the container, adjustment of the length of the signal cable to the optimal position of the sensor unit, creation of a separable electrical connection between the signal cable and the interface of the electronic control and evaluation unit by means of the connecting device, and creation of a separable mechanical connection between the housing and a container wall or a flange by means of the connecting device.

The level indicator for measuring the fill level of a container accordingly has a electronic control and evaluation system positioned, along with an interface, inside a housing; a sensor unit with a sensor and attachments; a signal cable that is guided through a wall of the container or through a process attachment, e.g., a flange, that can be mounted in a hole in the container, to create a connection between the electronic control and evaluation system and the sensor unit; and a connecting device, which produces both a mechanical connection between a process attachment and the housing for the electronic control and evaluation system, and an electrical connection between the interface of the electronic control and evaluation system and the signal cable. The mechanical and electrical connection produced by the connecting device is a separable or detachable one.

The term "process attachment" is understood to mean only the mechanical attachment for the process. It does not include the electrical connection. The process attachment can be, e.g., a flange or a screw thread. When the process attachment is a flange, the flange is welded to the container. The electronic control and evaluation system is contained in a housing which has a "counter-flange" that matches the container flange. The flange and counter-flange are firmly connected to each other with screws.

In a particularly advantageous configuration, terminals are provided inside the housing of the connecting device in order to produce a separable electrical connection, and a terminal is expediently provided for each lead of the signal cable. After the length of the signal cable has been suitably adjusted, the individual leads of the signal cable can be stripped, i.e., freed from their insulation (and if so desired, provided with an end sleeve), inserted into the terminal, and clamped there. In addition to creating the detachable electrical connection in this configuration, it is possible to ensure pull relief for the connection. For their own part, the terminals are electrically connected to the interface of the electronic control and evaluation system.

It proved to be the case that an eccentric configuration of the terminals is advantageous, in which the terminals are positioned radially and outwards, from the center of the housing of the connecting device toward the housing rim, since in this arrangement a particularly large amount of space is available for running the leads of the signal cable into the terminals. This work step can therefore be performed more simply and rapidly. Moreover, in this arrangement an effective pull relief of the electrical connection can be more easily realized, since more space is available for housing the additional length of cable which absorbs the action of the cable.

The process of manufacturing the separable electrical connection is particularly simple when the terminals positioned in the housing of the connecting device run at an angle to one lateral wall of the housing of the connecting device, since this arrangement ensures both good accessibility to the terminal mechanism and simple access to the insertion holes of the terminal.

It has also proven advantageous if the terminals are designed for cable cross-sections of a maximum of 2.5 mm×2.5 mm. When larger cable cross-sections are employed, the desired secondary effect of pull relief is no longer effectively provided, since the cable leads are already relatively rigid with a cross-section of the indicated size.

A particularly useful design specifies that the mechanical connection between the connecting device and the flange is a separable one and that the mechanical connection between the connecting device and the housing of the electronic control and evaluation system is inseparable.

In this design it is important to ensure the tightness of the connection, e.g., against the penetration of gas and/or liquid. This can be advantageously achieved by applying a circumferential groove to the support surface for the connecting device resting on the flange; the seal is then positioned in this circumferential groove. Tests performed by the applicant have shown that optimal results are achieved when the seal is injected into the groove. This can be done using, e.g., a thermoplastic elastomer.

The process provides for mounting a level indicator with an electronic control and evaluation system having an interface and positioned in a housing; a sensor unit with a sensor and attachments; a signal cable for producing a signal connection between the electronic control and evaluation system and the sensor unit; and a connecting device on and/or in a container, involves at least the following steps, which are performed in the indicated sequence, though additional operations can certainly be inserted between them, if so desired. First the sensor unit connected to the signal cable is inserted into the container and then the signal cable is guided through a wall in the container or through a flange used to seal a hole in the container. In the process, it is ensured that the sensor unit is located at an optimal position inside the container and that the length of the signal cable is then adjusted to this optimal position of the sensor unit. Then a separable electrical connection is produced between the signal cable and the interface of the electronic control and evaluation system by means of the connecting device, after which a detachable mechanical connection is produced between the housing and a wall of the container or a flange by means of the process attachment.

To produce the separable electrical connection, a particularly advantageous embodiment of the process provides a crimp connection between stripped signal cable leads, and/or signal cable leads provided with terminal sleeves, and the one or more terminals furnished on the connecting device. Creating a separable electrical connection in this way is particularly simple, but also highly reliable and safe.

BRIEF DESCRIPTION OF THE DRAWINGS

Next an exemplary embodiment is discussed in detail on the basis of drawings. Shown are.

DETAILED DESCRIPTION

Figure 1:
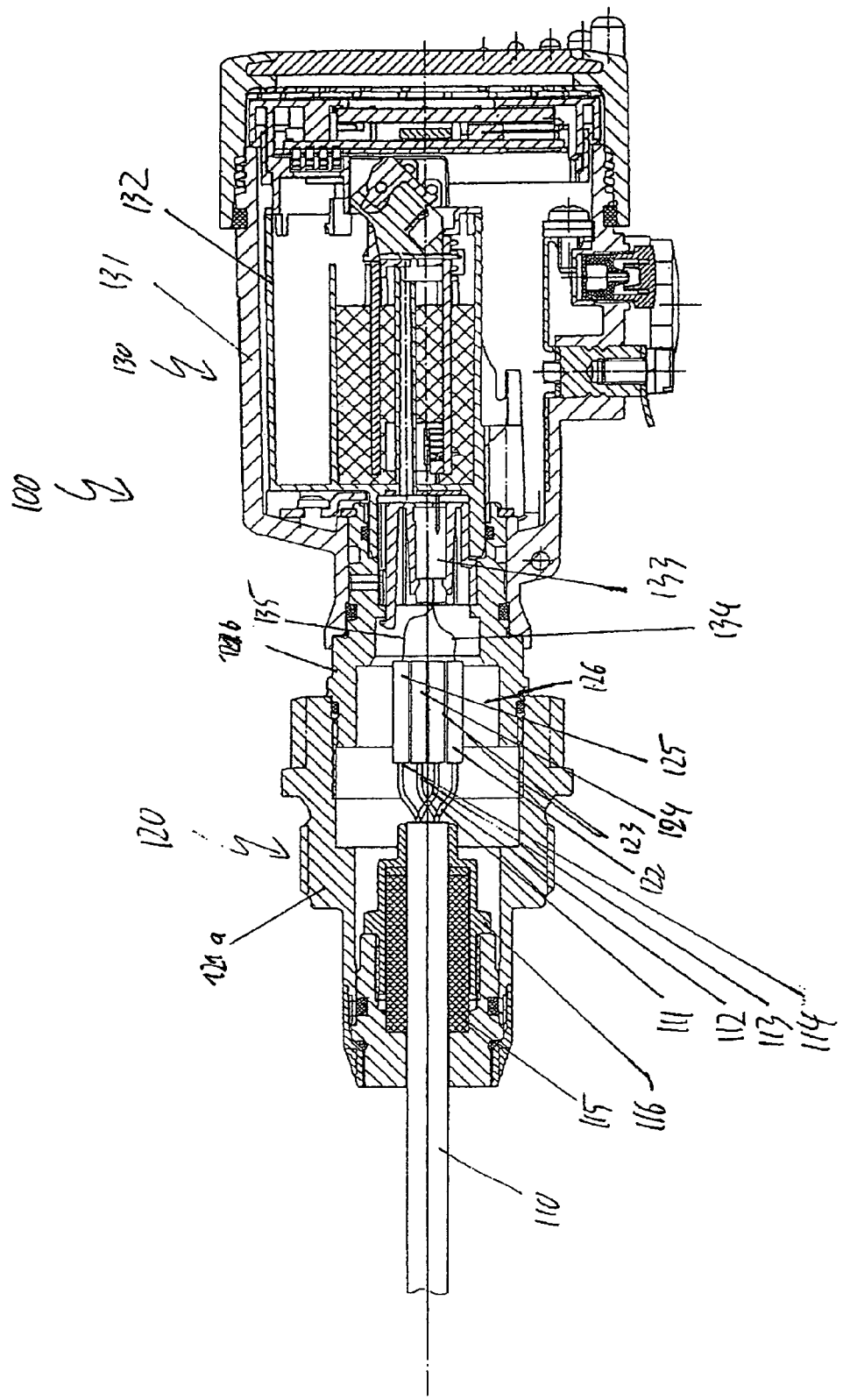
FIG. 1 a sectional view of a level indicator known to the prior art

FIG. 1 gives a sectional view of a level indicator known the prior art. Clearly visible is a signal cable 110, which is guided into the housing for a connecting device 120 and which is divided into leads 111, 112, 113, 114 in the interior of the connecting device. Sealing elements 115, 116 ensure that the lead-through is tight against liquid and/or gas.

The connecting device 120 has a process attachment with two housing sections 121a and 121b that are firmly connected to each other. Here housing section 121a is inserted into the hole of a container, which is not depicted, while housing section 121b is mechanically connected to the housing 131 (depicted in simplified schematic form) that encloses a control and evaluation device 130 and that overlaps the housing section 121b.

Also visible in FIG. 1 is a control and evaluation unit 130, with a housing 131, an electronic control and evaluation system 132 with an interface 133, and attachments 134, 135 to the interface 133. In FIG. 1 an electrical connection is produced in that crimp sleeves 122, 123, 124, 125 are positioned on a board 126 in the interior of housing sections 121a, 121b of the connecting device 120, and the stripped leads 111, 112, 113, 114 (provided with sleeves, if necessary) are guided into these crimps sleeves 122, 123, 124, 125 from the side of the signal cable 110, and the attachments 134, 135 of the interface 133 belonging to the electronic control and evaluation system 132 are also guided into said crimp sleeves from the direction of the electronic control and evaluation system 132, and both the leads and the attachments are fixed in position by crimping.

In a typical procedure for producing the level indicator known to the prior art (as depicted in FIG. 1), the attachments 134, 135 of the interface 133 belonging to the electronic control and evaluation system 132 are guided into the crimp sleeves 122, 123, 124, 125 and then the mechanical connection is produced between the housing section 121b and the housing 131 that contains the electronic control and evaluation system 131. The signal cable 110, which is already connected at one end to the sensor device (not depicted), is introduced into the hole provided for it in the housing section 121a of the connecting device 120, and an electrical connection to the electronic control and evaluation system is produced in that the leads 111, 112, 113, 114 of the signal cable 110 are also guided into the crimps sleeves 122, 123, 124, 125 and the crimps sleeves 122, 123, 124, 125 are then crimped with a special tool. Then the housing sections 121a and 121b are brought together and are mechanically connected to each other in permanent fashion. Subsequent adjustment of the cable length has thus become impossible.

Figure 2:
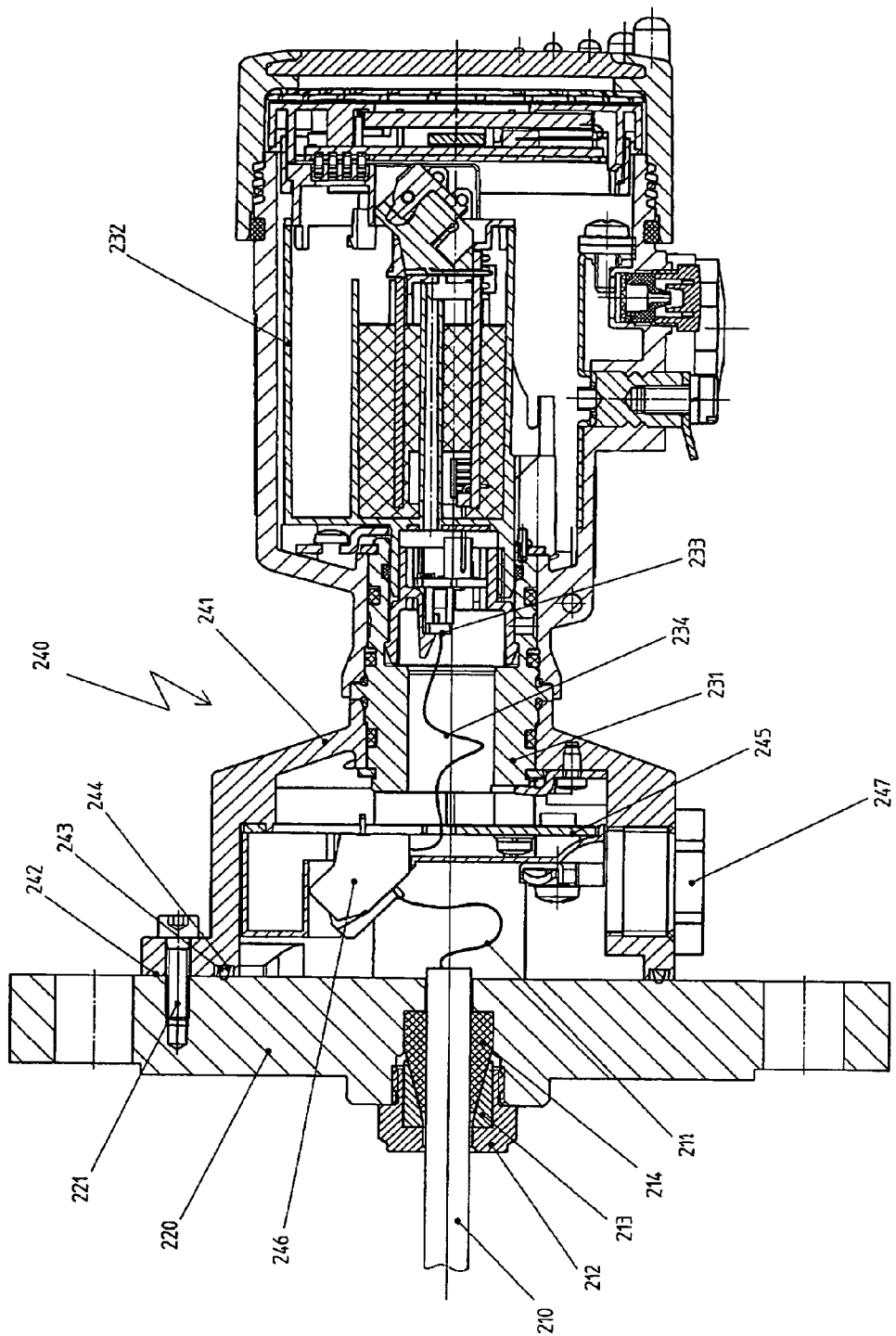
FIG. 2 a sectional view of the connecting device of a level indicator.

FIG. 2 shows the area occupied by a connecting device 240, as used in the level indicator. Clearly visible is one end section of a signal cable 210, whose other, undepicted end section is electrically connected to the undepicted attachments of a sensor device, which is also not shown. The signal cable 210 is guided through the flange 220, and a lead 211 emerges from the signal cable 210 on the side of said flange 220 that faces the connecting device 240. In actual practice, there is generally a plurality of leads 211, which, for the sake of simplicity, are not all depicted here.

It is urgently necessary to seal the lead-through of the signal cable 210 through the flange 220 against liquid and or gas. In the depicted embodiment this is done by providing a series of sealing elements 212, 213, 214.

The connecting device 240 has a radially symmetrical housing 241 for its process attachment, and this housing 241 rests against the flange 220 with a support surface 242. Applied to the support surface 242 is a groove 243 (with a rectangular design, in the present case), into which is injected a seal 244 consisting of TPE. To ensure a tight transition between the flange 220 and the connecting device 241, a tubular recess 247 is provided in the process attachment housing 241, and a screw (not depicted) is inserted into this recess 247. With its thread, the screw is able to engage in a blind hole 221 furnished on the flange 220 and thereby exert a pressing force between the support area 242 and the surface of the flange 220.

In its interior, the connecting device 240 also has a board 245, on which a number of terminals 246 are eccentrically positioned, e.g., in the form of a terminal strip. The number of terminals 246 corresponds to the number of leads 211. In addition, the terminals, or that portion of the terminals in which the leads 211 must be inserted, are positioned in diagonal fashion relative to the lateral wall, and this both permits the leads 211 to be introduced with particular ease and facilitates servicing of the terminal configuration.

The depicted terminal 246 receives a section of the lead 211 that is stripped and/or provided with an end sleeve. The terminal(s) 246 are electrically connected—if so desired, over the board 245—to the corresponding attachments 234 of an interface 233 belonging to electronic control and evaluation system 232, which is positioned in a housing 231. Here the housing 231 locks into the process attachment housing 241 and is firmly connected to the process attachment housing 241 in mechanical fashion.

This embodiment thus provides two preconfigured structural groups that can be connected to each other in mechanical and electrical fashion and that can be disconnected: on the one hand, the signal cable 210, which is connected to the sensor device, or its attachments, and is guided through the flange 220; on the other hand, the connecting device 240, which is already connected mechanically to the housing 231 of the electronic control and evaluation system 232 and which is electrically connected, over the terminal(s) 246, to the attachments 234 of the interface 233 belonging to the electronic control and evaluation system 232.

The user of the level indicator is thus able to adjust the length of the signal cable 210 to the optimal sensor position and then produce the separable electrical connection by inserting the leads 211, which are stripped and (if so desired) provided with end sleeves, into the terminals 246. These steps are followed by crimping. Then the mechanically separable connection is produced between the flange 220 and the process attachment housing 241. If for any reason there is a need to again change the length of the signal cable 210, this can be done without difficulty. It is only necessary to first undo the mechanical connection and then undo the electrical connection. For the screws or terminal connections provided in the exemplary embodiment, this can be done without difficulty at any time.

LIST OF REFERENCE NUMERALS 100 level indicator
110 signal cable
111 lead
112 lead
113 lead
114 lead
115 sealing element
116 sealing element
120 connecting device
121a first housing section
121b second housing section
122 crimp sleeve
123 crimp sleeve
124 crimp sleeve
125 crimp sleeve
126 board
130 control and evaluation unit
131 housing
132 electronic control and evaluation system
133 interface
134 attachment
135 attachment
210 signal cable
211 lead
212 sealing element
213 sealing element
214 sealing element
220 process attachment
221 blind hole with thread
231 housing
232 electronic control and evaluation system
233 interface
234 attachment
240 connecting device
241 housing
242 support surface
243 groove
244 seal
245 board
246 terminal
247 tubular recess

The invention claimed is:

1. Level indicator for measuring the fill level of a container, comprising:
   an electronic control and evaluation system with an interface, both positioned in a housing,
   a sensor unit with a sensor and attachments,
   a signal cable for connecting the electronic control and evaluation system and the sensor unit, and
   a connecting device, which produces both a mechanical connection between the sensor unit and the housing of the electronic control and evaluation system, and an electrical connection between the interface of the electronic control and evaluation system and the signal cable, the mechanical connection comprising a compressible sealing element engaging the cable, and a fastener, thereby allowing the user to adjust the length of the signal cable and subsequently seal the cable to the sensor unit,
   wherein
   both the mechanical and the electrical connections produced by the connecting device are separable ones.

2. Level indicator according to claim 1,
   wherein
   the electrical connection is produced over one or a plurality of terminals positioned in the connecting device.

3. Level indicator according to claim 2,
   wherein
   the terminals positioned in the connecting device are arranged eccentrically.

4. Level indicator according to claim 2,
   wherein
   the terminals positioned in the connecting device are arranged on a diagonal relative to a lateral wall of the process attachment.

5. Level indicator according to claim 2,
   wherein
   the terminals are designed for cable cross-sections of a maximum of 2.5 mm×2.5 mm.

6. Level indicator according to claim 1,
   wherein
   the mechanical connection between the connecting device and the flange is a separable one and the mechanical connection between the connecting device and the housing of the electronic control and evaluation system is an inseparable one.

7. Level indicator according to claim 6,
   wherein
   a circumferential groove is applied to the support surface on which the connecting device rests against the flange, and a seal is positioned in this circumferential groove.

8. Level indicator according to claim 7,
   wherein
   the seal is injected into the groove.

9. Level indicator according to claim 7,
   wherein
   the seal consists of a thermoplastic elastomer.

10. Level indicator according to claim 1,
    wherein
    the compressible sealing element comprises a passageway for the cable and an outer circumference, at least a portion of which forms an angle such that compression by the fastener results in an inward deflection of the compressible sealing element against the cable, thereby securing the cable in a sealing arrangement with the housing.

11. Process for assembling a level indicator with a control and evaluation unit, comprising an electronic control and evaluation unit positioned in a housing, an interface, a sensor unit with a sensor and attachments, a signal cable for creating a signal connection between the electronic control and evaluation system and a sensor unit, and a connecting device on and/or in a container, in which at least the following steps are executed:
    a) insertion into the container of the sensor unit connected to the signal cable,
    b) lead-through of the signal cable through a container wall or through a flange that is used to seal a hole in the container,
    c) adjustment of the length of the signal cable to the optimal position of the sensor unit,
    d) creation of a separable electrical connection between the signal cable and the interface of the electronic control and evaluation unit by means of the connecting device, and
    e) creation of a separable mechanical connection between the housing and a container wall or a flange by means of the connecting device the connecting device comprising a compressible sealing element engaging the cable, and a fastener, thereby allowing the user to adjust the length of the signal cable and subsequently seal the cable to the sensor unit.

12. Process according to claim 11,
    wherein
    to create a separable electrical connection a crimp connection is made between leads, which belong to the signal cable and are stripped and/or provided with end sleeves, and one or a plurality of terminals that are provided on the connecting device.

13. Process according to claim 11,
    wherein
    the connecting device is screwed together with the container wall, or with the flange, in order to create the separable mechanical connection.

14. Level indicator according to claim 11,
    wherein
    the compressible sealing element comprises a passageway for the cable and an outer circumference, at least a portion of which forms an angle such that compression by the fastener results in an inward deflection of the compressible sealing element against the cable, thereby securing the cable in a sealing arrangement with the housing.

* * * * *